May 15, 1962  C. L. COWAN, JR  3,035,172
RADIATION COUNTER

Filed March 25, 1958  2 Sheets-Sheet 1

Clyde L. Cowan, Jr.
INVENTOR.

BY
Attorneys

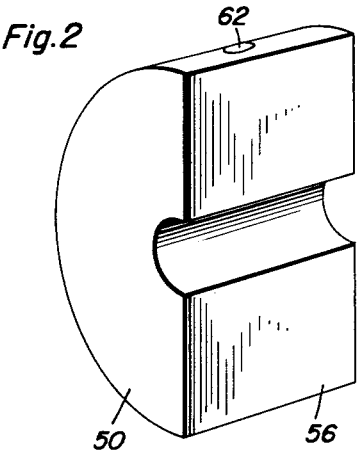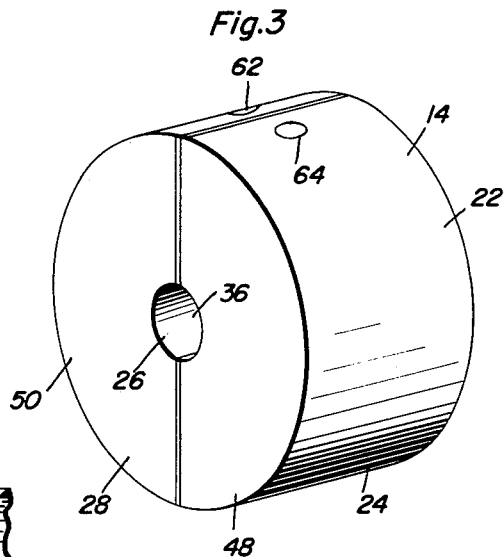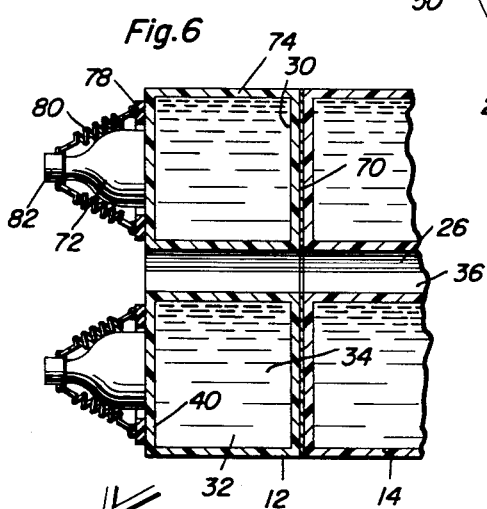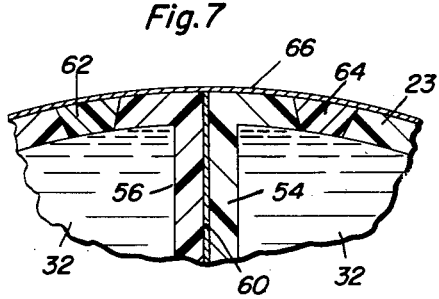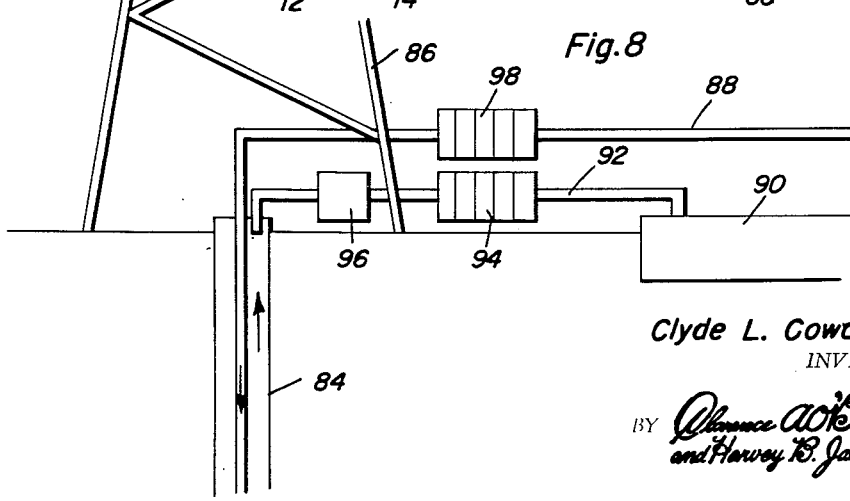
Clyde L. Cowan, Jr.
INVENTOR.

— # United States Patent Office 3,035,172
Patented May 15, 1962

3,035,172
RADIATION COUNTER
Clyde L. Cowan, Jr., 5812 Johnson Ave., Bethesda, Md.
Filed Mar. 25, 1958, Ser. No. 723,908
8 Claims. (Cl. 250—71.5)

This invention relates to a scintillating counter and more particularly to scintillating counters which have commercial and industrial application.

The scintillating counter uses a volume of radiation sensitive liquid which emits light when a fast charged particle such as an electron, meson or proton passes through it. For the purposes of describing a few examples of scintillation counters in accordance with the invention, the liquid may be benzene or xylene in which a quantity of P-terphenyl has been dissolved. Passage of a charged particle excites the molecules of the liquid which subsequently lose the energy of excitation in the form of light. Gamma rays and uncharged particles such as neutrons are detected by the liquid if prior to or during their passage through the liquid they give rise to secondary charged particles through collision processes or nuclear interactions. If the dimensions of the liquid volume are large enough, the impinging gamma ray or neutron will yield virtually all of its energy to the liquid through multiple collisions.

This fact results in the possibility of measuring the energy which the impinging particle contained upon entering the liquid by means of measuring the total amount of light emitted during its passage; and the development of a detector for uncharged particles which has very high efficiency for the detection of a given particle impinging upon it. Furthermore, if the dimensions of the liquid volume are large compared with the range in the liquid of a given high energy charged particle, or with the ranges in the liquid of a high energy gamma ray or uncharged particle and the ranges of all charged secondary particles resulting therefrom as described above, then detection and energy measurement of such high energy charged particles, gamma rays, or uncharged particles is made possible. Depending on the particular application for which a detector is designed, the thickness of such liquid volume may range from several inches to many tens of feet. With the thickness of liquid volume set by such conditions as these, the other two dimensions are set by consideration of the origin of the particles to be detected. Thus, if they are to come from a large sample of material flowing in a pipe, the detector may take the form of a cylinder coaxial with the pipe.

The amount of light emitted in this process is small, and as a result it is conserved by requiring that the liquid transmit the light with very low absorption and that the internal walls of the detector be highly reflective for the light. In general, it is required that the mean absorption length of the light in the liquid be several times the major dimension of the liquid volume. This is accomplished by careful chemical purification and multiple distillation of the liquid employed and by means of dissolved chemicals which shift the wavelength of the light into spectral regions where the transmission is higher. The light is detected by collecting it upon the faces of light sensitive devices, for example photomultiplier tubes, and using the resultant electrical signals to analyze the amount of light and any time characteristics which are relevant.

Therefore, such a detector may contain several hundreds of gallons of liquid scintillator. The detector must contain this liquid with no loss by leakage or seepage. There may be no contamination of the scintillating liquid by leaching greases or other chemicals from the container, gaskets, etc. The detector must be light-tight, so that ambient light does not enter the detector to interfere with the measurement. The reflectivity of the walls must be high.

This invention accomplishes the foregoing purposes and overcomes the above impediments in a manner and to a degree which have not been accomplished before by any counter or detector and which, furthermore, provides a detector which is superior in additional features to any previous counter or detector.

It is an object of this invention to provide a liquid scintillation detector and counter wherein the liquid is held in a casing that has light transmissive walls. The casing may be made of glass or plastics having suitable characteristics of imperviousness to the scintillator liquid and having satisfactory light transmissive properties. Therefore, the white material which is the best for light reflecting purposes is placed on the outside of the clear walls of the casing thereby preventing the degradation of the reflecting properties of the material by wetting with the liquid and also preventing the liquid from becoming contaminated by the light reflective material, such as magnesium dioxide.

A further object of the invention is to provide a modular system of casings that have liquid scintillator preferably sealed in them and that are made of walls that have light transmissive properties. Depending on the type of installation and the purpose of the scintillation counter, the modular units can be increased or decreased in number. Each unit will have all of its walls covered on the outside with a light reflective substance, except those walls which register with walls of adjacent modular casings and portions of the exterior walls of the entire modular assembly. These portions will have photomultiplier tubes or equivalent light sensitive devices to detect the quantity of light in the scintillation counter. The entire counter assembly, including such modular assemblies and photomultiplier tubes as described above will be enclosed in and supported by an opaque, light-tight box or other container, constructed of metal, plastics, wood or other suitable material to provide support and protection to the counter assembly and to assure that no ambient light, dust, moisture, etc. from the outside will impinge on the counter assembly, on the photomultiplier tubes or on associated circuitry inside the box.

An important feature of the invention is the construction of the casings. They are made so that they can be assembled in one or more units to increase or decrease the total size and capacity of the scintillator counter and moreover, at least some of them are made sectional. This provides several options in the application of the scintillation counter. Translucent or opaque shields can be used to isolate sections of one casing from each other or sections of adjacent casings from each other. Similar shields can be used to isolate the entire casings from each other thereby forming discrete units within the assembly. In specialized cases isolation of sections and/or casings will yield desired results. For example such an organization will enable the counting of isotopes with two gamma rays emitted in coincidence in some places and under some conditions.

A more explicit object of the invention is to provide a commercial and industrial liquid scintillation counter for radiations, the counter characterized by a cylindrical casing that has a cylindrical outer wall and a cylindrical inner wall spaced apart by integral side walls. This forms an approximately toroidal chamber within which the scintillator liquid is confined. A conduit extends through the passageway that is formed by the inner cylindrical wall and conducts the fluent material (liquid, gas, or otherwise) which is to be counted. A practically inexhaustible number of fluent materials and other substances can be counted by a scintillation counter having a casing constructed in this manner. The following is by way of example only and is not intended to be exclusionary in any sense of the word. Radiation may be counted in a water supply, milk line, juices for human consumption or otherwise, foods of any kinds that are capable of flowing, etc. An exceedingly important use is in connection with the products of an oil well and this will be discussed in more detail subsequently. All kinds of contamination can be counted regardless of the cause so long as the contamination emits gamma radiations, or neutrons, or other radiations capable of entering the counter or of introduction into the scintillation liquid.

Although specialized, the segmentation of the counter casing or of the counter itself (by multiple casings) and with an opaque panel is specialized in comparison to the general abilities of the counter. However, these specialized applications are of importance. This is so because the results of one segment can be correlated with the other segment and valuable information obtained therefrom. The same holds true when two complete counters are used in one apparatus or system. The results of one complete counter can be correlated with the results of another complete counter and especially by using modern electronic adding circuits, the information that is obtained in this way will yield results that were heretofore difficult or impossible to determine.

Segmenting a detector can solve many problems much easier than they were capable of solution by other empirical or test methods. Cobalt 60 yields two gamma rays which usually diverge. Therefore by requiring each segment of a single casing to count the right time and energy, cobalt 60 can be counted or discriminated from backgrounds much more sensitively. The same applies to other elements and, therefore, it is seen that this counter is both flexible and versatile.

Prior radiation counters using large bulks of scintillating liquids are heavy laboratory equipment and wholly incapable of commercial and industrial application because of their bulk and because of their construction, making it inherently impossible to use them in other than under strict laboratory conditions. Therefore it is a further object of the invention to provide a practical and versatile radiation detector and/or counter which can be used in many environments and to sense and/or count radiations in many substances.

Since a typical although certainly not exclusionary, application of a radiation counter, is for analysis of oil well borings, one arrangement is detailed. A continuous flow of drilling mud, chips, borings, water, gases, cores or other affluent material from well holes of oil wells, gas wells or others, which is obtained during the drilling operation is passed through a counter constructed in accordance with this invention. This provides a continuous and extremely sensitive analysis of the radioactive content without interruption of the drilling process. Such a flow may consist of the entire affluent from the well head or a fraction thereof. The material so analyzed, may be passed through the counter either with or without a delay period after emerging from the well with or without concentration or dilution as the situation warrants.

In addition, a second counter may be used to determine the initial radioactive content of the muds, water, gases or other materials that may be forced into the well as drilling proceeds. A difference in the radioactive content as determined by the two counters between the material emerging from and that entering the well may be determined as a measure of the increase due to the nature of the material through which the drill bit is cutting.

By radioactive content it is meant that both the identity and quantity of radioactive isotopes may be determined. The extreme sensitivity of counters constructed in accordance with this invention permits rapid and highly accurate analysis to be made which are impossible by other means. Moreover, the analysis requires no costly drilling interruptions, and this is exceedingly important from a practical standpoint.

The radioactive content may be that which is present naturally in the affluent material; that which is mixed with the material by the independent introduction of radioactive materials into the well or its surroundings; or that which has been artificially induced in the material by means of neutron, electron or gamma ray bombardment. The last mentioned method permits the continuous analysis of the affluent material for chemical elements not naturally radioactive but rendered so by such bombardment. Neutron sources to achieve this are available and certain equipment is commercially available such as Van de Graaff machine or Cockroft-Walton machine. The extreme sensitivity of the counter will permit continuous chemical analysis to be made and the identification of even trace elements which would be difficult to detect otherwise except by tedious chemical procedures. The methods and procedures mentioned above are not only applicable to wells but are generally applicable in other situations and industries. Moreover, the detector and counter is highly sensitive to ionizing radiations and to those radiations which produce ionizing radiations, whether the source of such radiations is inside the detector or outside of it. The detector may be employed to detect and examine radiations which originate either inside of or outside of the counter.

Although the accompanying drawings have certain representations thereon, these are schematic for the most part and illustrate only simple modes and structures by which to practice the principles of the invention. Rather sophisticated electronic computors could be used in the very precise measurement of light contained on the detector or counter, but these equipments are added to the illustrated and/or described embodiments of the invention and are not an essential part of what is actually invented. The electronic sensing circuits are drawn from prior art.

The illustrated and descibed forms of the invention exemplify the invention in operation and some of its uses.

FIGURE 2 is a perspective view of one section of one casing in FIGURE 1.

FIGURE 3 is a perspective view of one of the casings in FIGURE 1.

FIGURE 6 is a fragmentary sectional view taken on the line 6—6 of FIGURE 1.

FIGURE 7 is an enlarged sectional view showing a detail of construction and illustrating principally the light reflective substance on the exterior surfaces of the transparent walls of two sections and also showing an optionally used opaque shield between the sections of a casing.

FIGURE 8 is a schematic view showing an application of the invention in connection with an oil well.

Figure 1:
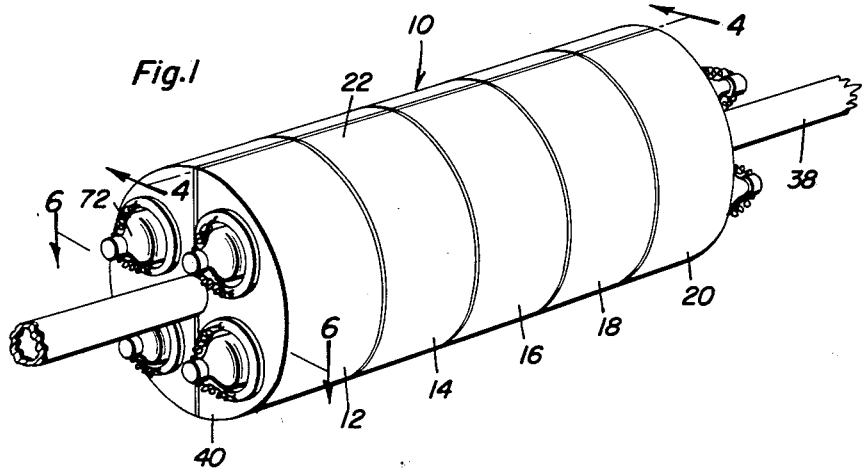
FIGURE 1 is a perspective view of the apparatus showing its use in connection with a fluent material conduit, the light-tight enclosure and supports omitted.
Figure 4:
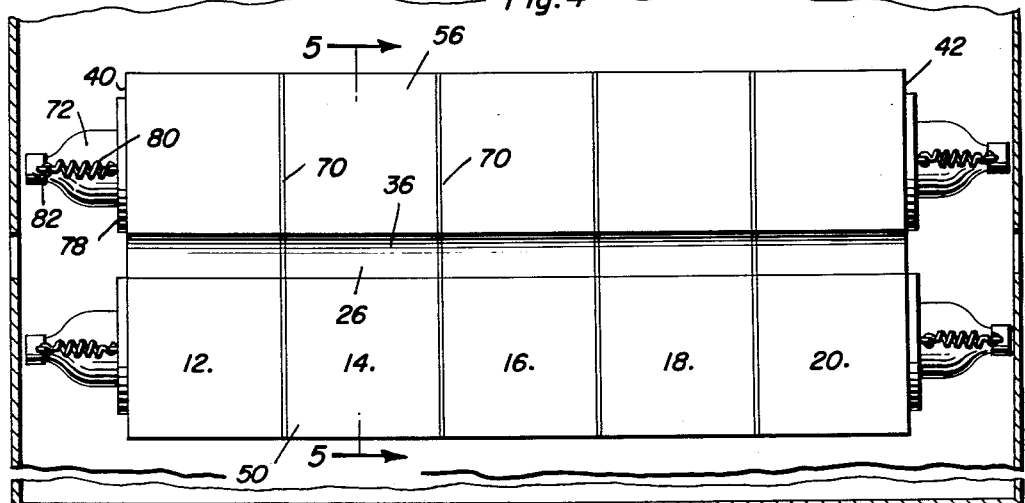
FIGURE 4 is a view taken on the line 4—4 of FIGURE 1.
Figure 5:
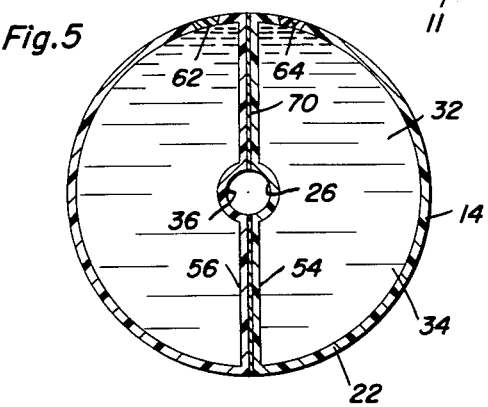
FIGURE 5 is a sectional view taken on the line 5—5 of FIGURE 4.

In the accompanying drawings there is a liquid scintillation detector and counter 10 which exemplifies the invention, but for the purpose of simplicity will be termed "counter" only hereafter. Counter 10 has an enclosure 11 with opaque walls to exclude ambient light and maintain its parts in a protective supporting organization. The enclosure is omitted in most of the figures of the drawings to show the parts of the counter. Counter 10 is made of five modules 12, 14 and 16, 18 and 20 respectively. This number can be decreased to one module or even a part of a module or can be increased indefinitely. In one form of the invention a typical module has casing 22 (FIGURE 3) provided with a cylindrical outer wall 24, a cylindrical inner wall 26 and flat front and rear or first and second walls 28 and 30 (FIGURE 6). This encloses an approximately toroidal liqiud chamber 32 within which the scintillator or scintillator liquid 34 is captive. This is merely one configuration which can be changed. In fact a very practical form of casing would be cubic or rectangular or a coil. Any geometrical solid shape can be adopted. The scintillator liquid may be benzene, xylene, toluene, triethylbenzene or any other liquid scintillator solution which has been suitably activated by the addition of the phenyl and/or other activating materials and which emits light when a fast charge particle such as electron, meson or proton passes through it.

Cylindrical wall 26 forms a passageway 36 through which a conduit 38 can pass. Conduit 38 schematically represents the conductor of any fluent material, either granular solids or liquid or gaseous, the radiation of which is to be counted. Casing 22 is one of the casings of the intermediate modules 14, 16 or 18 in the illustration. Therefore, at least wall 24 is coated on its exterior with a substance that is highly reflective of light. Magnesium oxide is one of the whitest substances that is known and can be used on the exterior of the chamber 32, because it is then isolated by the walls of the casing from the liquid scintillator. In some applications the intermediate modules will not have to have their inner cylindrical walls 26 coated with light reflective material, although it is preferred. Therefore the passageway 36 will have a coating or film of magnesium oxide or some other very white substance on wall 26. The casings or the end modules 12 and 20 have their outer walls 40 and 42 covered with light reflective material not only to reflect any light which is formed in the casings (or single casing when only one is used) of the counter but also to exclude ambient light. To further this end, the entire apparatus may be enclosed in a lightproof dark box or housing of any type and configuration.

Although casing 22 can be made as a complete cylindrical section containing a passageway through it on its axis or otherwise, it would be quite difficult to apply to an existing conduit 38. The conduit would have to be cut and the casing slipped thereon. For this reason and for others that will be described further, it is preferred at times that each casing, for example see casing 22, be made in sections 48 and 50. Each is a semi-cylinder, and the separation is made by confronting walls 54 and 56 that are connected with the edges of the inner and outer walls 23 and 24 and also the walls 28 and 30. Moreover, the sections 50 and 48, when united as shown in FIGURE 3, will function as though they were made as one single unit. But the option is provided for isolating section 50 from section 48. This is done by inserting an opaque panel 60 over the confronting surfaces of the top walls 54 and 56 (FIGURE 7). Panel 60 can be made of metal, plastic, paper or any other substance. Further, this principle of isolating one section from the other can be applied between aligned sections of adjacent modules or applied between adjacent casings to isolate one entire casing from another.

Two plugs 62 and 64 (FIGURE 7) are shown beneath the coating or film 66 of light reflective substance on the outside surface of the walls of casing 22. These plugs are in filler holes through which the scintillator liquid was passed to enter the chamber 32. Two filler plugs are necessary because the chamber 32 is divided by walls 54 and 56 that separate the casing into the sections 48 and 50.

Figure 9:
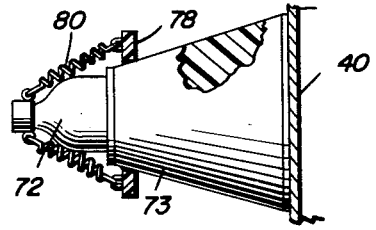
FIGURE 9 is a fragmentary sectional view of a modification using a light pipe.

One of the factors that contribute to the practicability of this counter is the material of construction of the casing walls. The material is light transmissive throughout, and the casing is preferably made with as few joints as possible, and these joints are permanently sealed to make an internal construction of each section of each casing. The casing may be made of glass, in whole or part. If in part, then the remaining part may be made of a suitable clear plastic material. Or the casing may be made of a clear plastic material entirely. There are a number of commercially available plastic materials which can be used in place of glass, these usually being sold under the trademarks and names such as "CR–39."

Where faces of sections or casings come together it is suggested that a film of index refraction matching, transparent grease 70 be applied. The same applies where the face of the photomultiplier tubes 72 contact a surface of a wall, for example wall 40 of casing 74 of end module 12. The photomultipler tube 72 is one of a group held pressed firmly against a portion of wall 40 that is unmasked by the light reflective material. Photomultiplier tube 72 schematically represents any type of light sensitive transducer. Tube 72 is held in place by ring 78 that is fastened to wall 40, as by cementing or adhering in some other way and to which a group of springs 80, preferably three or more, are secured. These springs are attached to a cap 82 that fits over the neck of tube 72 or the springs are attached in some suitable manner to the tube base or to the tube socket. Electric wires are operatively connected to the cap, to the tube socket or to the tube base. The tube may be fitted, if desired, with a shield against magnetic fields, in the usual manner. Furthermore, the tube may be placed at some arbitrary distance away from the face of the casing, wall 40, and the light transmitted to the tube by means of suitably shaped light pipes 73 (FIGURE 9) made of a suitable plastic material, such as "Lucite." A typical light pipe installation has one face of the pipe cemented to a wall of one casing, and a film of transparent grease between the other face of pipe 73 and the tube. A light pipe reduces the residual radioactive background due to gamma rays originating in the tube and otherwise falling on the sensitive volume of scintillating liquids, and it also equalizes the response of the tube to light signals arising in the liquid 34 near the face of wall 40 with those arising deeper in the counter, such as in casings 14, 16 or 18. Similar treatment would be used in the mountings of all tubes of a given counter with respect to their respective casing walls. This shielding from contamination in the tubes and equalization of response may also be accomplished without the use of the light pipe 73; but instead by construction as in FIGURE 1, wherein those modules 12 and 20 registering with the photomultipler tubes 72 are filled with non-scintillating liquids such as pure water. The photomultiplier tube groups are shown at each end of the counter, though for certain applications they may be placed at other surfaces, suitable cylinder-to-flat surface light pipe adapters being employed where required.

In use, in addition to what has been described previously, radioactive elements, even trace elements, cause light emission to occur in the chamber or chambers of the counter, and this light is trapped therein. Therefore, it can be measured by electronic measuring circuitry including light sensitive elements, such as the photomultiplier tubes 72. Information can be obtained and deductions made in a manner described.

FIGURE 8 shows an oil well bore 84 with a structure 86 above it. FIGURE 8 represents a more comprehensive use of the liquid scintillation counter, depicting a process of obtaining information of the sub-soil strata and composition of materials that are received during drilling operations, and without interruption of these operations. During drilling operations drilling mud, bentonites and many other components are delivered into the bore 84, and to show this conduit 88 is illustrated. These are recovered with the drilling mud returning to pool 90 through conduit 92. A single counter 94 made exactly like the counter in FIGURE 1 or made in accordance with a variation thereof can be applied on conduit 92 for counting the radiation in the recovered substances from the well bore 84. This will give a direct indication of the stratum, its condition, and its composition.

A variation has a neutron source 96 or some other means for introducing or inducing additional, known radiations into the material passing through conduit 92, is applied to that conduit and on the upstream side of counter 94. An additional counter 98 may be also used with conduit 88 so that information may be obtained therefrom and used with the information obtained from instruments 94 and 96 to complete a more sophisticated system for radiation counting in well drilling operations without interruption to such operations.

It is understood that various changes and modifications in addition to those explicitly mentioned herein may be made without departing from the claimed invention.

What is claimed as new is as follows:

1. In a scintillation counter to count and identify gamma rays and high energy radiation emitting substances by using a liquid scintillator, the improvement comprising a modular assembly having discrete casings adjacent to each other and each containing a liquid scintillator substance, two of said casings having transparent confronting walls, the remaining walls of said casings being transparent and having a light reflective substance on the exterior surfaces thereof to prevent direct contact of the scintillator with said reflective substance.

2. In a large volume scintillation counter which measures the amount of light emitted in a scintillator, the improvement comprising a modular assembly having discrete casings adjacent to each other and each containing a liquid scintillator substance, two of said casings having transparent confronting walls, the remaining walls of said casings being transparent and having a light reflective substance on the exterior surfaces thereof to prevent direct contact of the scintillator with said reflective substance, a passageway in each casing, said passageways registered with each other and adapted to receive material whose radiation is to be counted.

3. Apparatus to count radiation in material flowing through a conduit and which has radiation sensitive liquid that emits light when a fast charged particle is passed through it, said apparatus comprising a casing having transparent walls and enclosing a liquid chamber containing said liquid, one of said walls having a passageway through which the material conducting conduit extends thereby locating said chamber around the conduit, a light reflective substance on the exterior surface of the walls of said chamber thereby isolating said light reflective substance from said liquid, means including a light sensitive transducer registered with an unmasked part of one of said chamber walls for measuring the total light in said chamber, a second casing having transparent side walls enclosing a scintillating liquid, one of said transparent side walls registered with a wall of the first casing, a film of light reflecting material on the exterior surface of the other of said side walls of said second casing, and a passageway in said second casing through which said conduit extends.

4. Apparatus for detecting radiation in a flow of fluent material without discontinuing the flow, said apparatus comprising a first radiation sensitive counter in the presence of said flow, a neutron source downstream of said first counter and separate from but in the presence of said flow for applying known radiation to normally non-radioactive susbtances in said flow to produce isotopes of short half-life, a second radiation sensitive counter in the presence of said flow and downstream of said neutron source to sense total radiation in the flow after passing said neutron source, said first radiation counter including a casing having transparent walls enclosing a chamber, a liquid scintillating substance in said chamber, and a light reflective film on the exterior surface of said walls.

5. The apparatus of claim 4 and means for isolating portions of said casing to discriminate radiations in each isolated portion.

6. In a liquid scintillation counter for high energy and gamma ray and like radiations, a modular assembly comprising a plurality of self-contained sealed casings in side by side arrangement, a first of said casings having an outer wall, a pair of end walls joined to the edges of said outer wall, all of said walls being light transmissive and defining a cavity containing a sealed-in liquid scintillator substance, a light reflective coating on the outside surface of said outer wall, a second of said casings having a second outer wall provided with a light reflector on the outer surface thereof, a pair of end walls joined to the outer edges of said second outer wall, the last-mentioned end walls being light transmissive with one of the end walls juxtaposed with one of the end walls of the first-mentioned pair of end walls, and means defining a continuous passageway through both of said casings in which the material to be counted may be accommodated.

7. The counter in accordance with claim 6 wherein said first casing has confronting walls subdividing said casing into two sections and said cavity into separate compartments each containing a quantity of said liquid scintillator substance.

8. The counter defined in claim 7 wherein there are means at said confronting walls to exclude light transmission between said sections.

References Cited in the file of this patent

UNITED STATES PATENTS

| | | |
|---|---|---|
| 2,374,197 | Hare | Apr. 24, 1945 |
| 2,583,288 | Arps | Jan. 22, 1952 |
| 2,659,046 | Arps | Nov. 10, 1953 |
| 2,744,199 | Juterbock et al. | May 1, 1956 |
| 2,750,514 | Armistead | June 12, 1956 |
| 2,841,715 | Schultz | July 1, 1958 |

OTHER REFERENCES

Large Volume Liquid Scintillators: Their Applications, by Harrison et al., from Nucleonics, vol. 12, No. 3, March 1954.

Liquid Scintillation Techniques for Radiocarbon Dating, by Pringle, R.W., et al., from the Review of Scientific Instruments, vol. 26, No. 9, September 1955, pages 859–865.

The Role of Liquid Scintillators in Nuclear Medicine, by Hayes, F. N., et al., from Peaceful Uses of Atomic Energy, published by United Nations, 1956, vol. 14, pages 182 to 187.